(12) United States Patent
Noureddine

(10) Patent No.: US 9,229,949 B2
(45) Date of Patent: Jan. 5, 2016

(54) EXTENSIBLE AND GENERIC FRAMEWORK FOR MANAGING RESOURCES FOR DATA WAREHOUSING LOADS

(75) Inventor: Sadek Noureddine, Beirut (LB)

(73) Assignee: Microsoft Technology Licensing, LLC, Redmond, WA (US)

( * ) Notice: Subject to any disclaimer, the term of this patent is extended or adjusted under 35 U.S.C. 154(b) by 238 days.

(21) Appl. No.: 13/268,644

(22) Filed: Oct. 7, 2011

(65) Prior Publication Data

US 2013/0091089 A1 Apr. 11, 2013

(51) Int. Cl.
*G06F 17/30* (2006.01)
*G06F 9/50* (2006.01)

(52) U.S. Cl.
CPC ........ *G06F 17/30165* (2013.01); *G06F 9/5011* (2013.01); *G06F 17/30445* (2013.01); *G06F 17/30592* (2013.01)

(58) Field of Classification Search
CPC ................. G06F 17/30165; G06F 17/30168; G06F 17/30171; G06F 17/30592
USPC .................................. 707/607, 608, 703, 704
See application file for complete search history.

(56) References Cited

U.S. PATENT DOCUMENTS

| | | | | |
|---|---|---|---|---|
| 5,050,166 | A * | 9/1991 | Cantoni et al. | 370/473 |
| 5,504,899 | A * | 4/1996 | Raz | 707/999.01 |
| 6,118,456 | A * | 9/2000 | Cooper | 345/619 |
| RE37,494 | E * | 1/2002 | Cantoni et al. | 370/395.6 |
| 6,832,229 | B2 | 12/2004 | Reed | |
| 7,003,560 | B1 | 2/2006 | Mullen et al. | |
| 7,509,326 | B2 | 3/2009 | Krabel et al. | |
| 7,783,605 | B2 | 8/2010 | Meyerson | |
| 7,814,492 | B1 * | 10/2010 | Creemer et al. | 718/100 |
| 2005/0010558 | A1 | 1/2005 | Dettinger et al. | |
| 2005/0228873 | A1 * | 10/2005 | Tapuska et al. | 709/219 |
| 2007/0282839 | A1 * | 12/2007 | Walker | 707/E17.007 |
| 2009/0178042 | A1 | 7/2009 | Mehta et al. | |
| 2010/0114849 | A1 * | 5/2010 | Kingsbury et al. | 707/704 |

OTHER PUBLICATIONS

Luo, et al., "Transaction Reordering and Grouping for Continuous Data Loading", Retrieved at <<http://citeseerx.ist.psu.edu/viewdock/download?doi=10.1.1.81.4945&rep=rep1&type=pdf>>, in the Proceedings of the 1st international conference on Business intelligence for the real-time enterprises, 2007, pp. 34-49.

Maqbool-Uddin-Shaikh, et al., "A Step towards Centralized Data Warehousing Process: A Quality Aware Data Warehouse Architecture", Retrieved at <<http://www.alzaytoonah.edu.jo/Faculties/Science/Conferances/ICIT09/PaperList/Papers/Software Engineering/498Maqbool.pdf>>, Jun. 3-6, 2009, pp. 6.

Martens, et al., "Dynamic query scheduling in parallel data warehouses", Retrieved at <<http://citeseerx.ist.psu.edu/viewdoc/download?doi=10.1.1.169.9141&rep=rep1&type=pdf>>, Concurrency and Computation: Practice and Experience, Dec. 15, 2002, pp. 1169-1190.

* cited by examiner

*Primary Examiner* — Vincent F Boccio

(74) *Attorney, Agent, or Firm* — Brian Haslam; Kate Drakos; Micky Minhas

(57) ABSTRACT

Methods, systems, and computer program products are provided for managing resources. A request is received for a plurality of resources from a requester. A ticket is generated for the request that indicates the resources. For each resource, a resource provider for the resource is queried to determine whether the resource can be acquired. The ticket is queued if any of the resources cannot be acquired. The ticket is granted if all of the resources can be acquired.

20 Claims, 8 Drawing Sheets

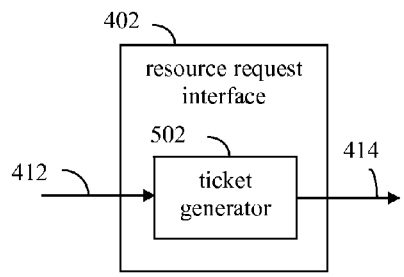
FIG. 5
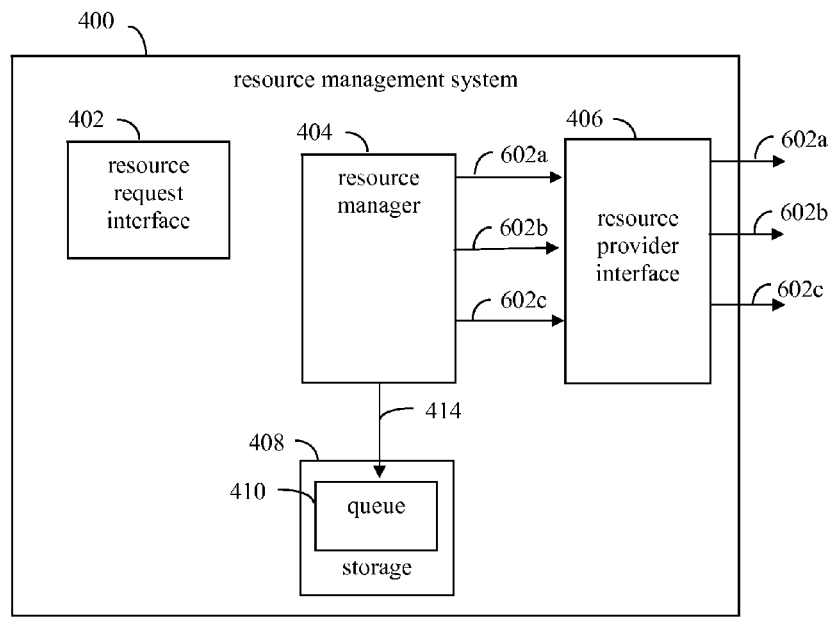
FIG. 6
702
instruct each resource provider to release any resources that were locked during step306 if a resource provider indicates that a resource cannot be acquired
FIG. 7

EXTENSIBLE AND GENERIC FRAMEWORK FOR MANAGING RESOURCES FOR DATA WAREHOUSING LOADS

BACKGROUND

Storage devices are used to store data. Examples of storage devices include hard disk drives, memory devices, and optical disc drives. Data may be stored in various configurations of data storage, and may be organized in storage in various ways. For instance, data may be collected and organized in databases, which may be stored in collections of storage, such as network attached storage (NAS) arrays, storage area networks (SAN), and further arrangements of physical storage. The amount of data requiring storage continues to increase at a fast pace, and as such the need is increasing for larger capacity storage, as well as better types of storage organization.

A data warehouse is an example type of repository of historical data for an entity, such as a corporation. Data warehouses are designed to allow complex queries and analysis to be performed on the data without slowing down day-to-day operational systems. As such, data warehouses are useful for reporting and analysis. Various types of data warehouses exist, including online analytical processing (OLAP) databases.

Managing access to stored data, such as data stored in a data warehouse, is challenging because multiple users may desire to access the same data simultaneously. For instance, a first user may desire to modify particular data while a second user desires to read the data to perform operations. This may be undesirable for the second user, as the value of the particular data may change during the operations, leading to a data concurrency issue. Furthermore, a data warehouse may include numerous data sets that are managed by different providers, leading to different techniques needing to be used to interface with the different providers.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, and computer program products are provided for managing resources that are available at a plurality of resource providers. A requester may desire access to a portion of the resources, and may provide a resource request to a resource management system to that effect. A ticket is associated with the resource request. The ticket contains a list of the resources that are desired to be accessed. A resource manager attempts to acquire all of the resources of the ticket at the resource providers. If all resources in the ticket are able to be acquired, the ticket is granted and the requester is enabled to access the requested resources. If any resource in the ticket is not able to be acquired, then none of the resources in the ticket may be accessed by the requester, and the resource request is placed in a queue to be re-tried later.

In one example method implementation, a request is received from a requester for a plurality of resources. A ticket is generated for the request that indicates the resources. For each resource, a resource provider for the resource is queried to determine whether the resource can be acquired. The ticket is queued if any of the resources cannot be acquired. The ticket is granted if all of the resources can be acquired.

In an example system implementation, a resource management system is provided. The resource management system includes a resource request interface, a resource provider interface, and a resource manager. The resource request interface receives a request for a plurality of resources from a requester, and generates a ticket for the request that indicates the resources. The resource provider interface is communicatively coupled with a plurality of resource providers. For each resource of the plurality of resources, the resource manager queries a resource provider for the resource through the resource provider interface to determine whether the resource can be acquired. The resource manager is configured to queue the ticket in a queue if any of the resources cannot be acquired, and is configured to grant the ticket if all of the resources can be acquired.

The resource management system may further include a queue manager. The queue manager is configured to prioritize tickets in the queue based on priority indications received in requests for resources.

Computer program products are also described herein for managing accesses to resources, as well as for enabling additional embodiments.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

FIG. 5 shows a block diagram of a resource request interface configured to generate tickets, according to an example embodiment.

FIG. 6 shows a block diagram of the resource management system of FIG. 4, where a resource request is queued, according to an example embodiment.

FIG. 7 shows a process for unlocking resources that were locked for a ticket that cannot be fulfilled at a current time, according to an example embodiment.

Figure 1:
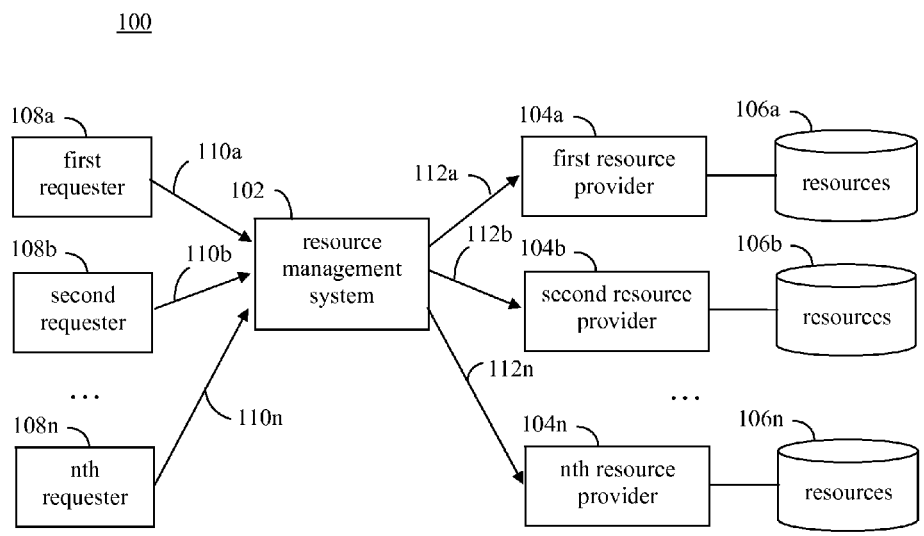
FIG. 1 shows a block diagram of a resource acquisition environment, according to an example embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification discloses one or more embodiments that incorporate the features of the invention. The disclosed embodiment(s) merely exemplify the invention. The scope of the invention is not limited to the disclosed embodiment(s). The invention is defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Numerous exemplary embodiments of the present invention are described as follows. It noted that any section/subsection headings provided herein are not intended to be limiting. Embodiments are described throughout this document, and any type of embodiment may be included under any section/subsection.

II. Example Embodiments

Data may be stored in various configurations of data storage, and may be organized in storage in various ways. For instance, data may be collected and organized in databases, which may be stored in collections of storage, such as network attached storage (NAS) arrays, storage area networks (SAN), and further arrangements of physical storage. A data warehouse is an example type of repository of historical data for an entity, such as a corporation. Data warehouses are designed to allow complex queries and analysis to be performed on the data without slowing down day-to-day operational systems. As such, data warehouses are useful for reporting and analysis. Various types of data warehouses exist, including online analytical processing (OLAP) databases.

Managing access to stored data, such as data stored in a data warehouse, is challenging because multiple users may desire to access the same data simultaneously, leading to problems with concurrency. Furthermore, a data warehouse may include different data sets managed by different providers, leading to different techniques needing to be used to communicate with the different providers.

In embodiments, the accessing of resources and maintaining of concurrency control in data storage, such as a data warehousing database system, is provided in a generic and extensible manner. In an embodiment, interfaces are used to define requested resources and resource providers, and a central resource manager manages resource requests that come from the different requesters.

In an embodiment, each resource request is provided with an associated ticket. The ticket contains a list of the resources that are requested. A resource manager performs a lookup of the resource providers for the resources in the ticket and attempts to acquire all of the resources at the resource providers. If all resources in the ticket were acquired, the ticket is granted and the resource request is enabled to continue (e.g., the requester is enabled to access the requested resources). If any resource in the ticket is not acquired, none of the resources in the ticket are acquired, and the resource request is placed in a queue to be re-tried later. This "all or nothing" feature for acquisition of tickets has an advantage of preventing data request deadlocks.

Furthermore, in embodiments, priority in resource requests is enabled. For instance, each resource request may provide a priority that is placed on its associated ticket. The priority may raise the level of the ticket in the queue (if the ticket is placed in the queue), increasing a probability that the ticket may be granted before other tickets. This ticket priority feature provides advantages, including enabling particular resource requests/queries to be performed before others. For example, a CEO's report that the CEO runs in the morning may have a priority associated with it. The priority may enable the report to be run with higher priority so that the report is not queued behind other resource requests.

Still further, by using tickets, a monitoring of resource requests may be performed more easily. For instance, displays of the status of one or more resource requests may be generated (e.g., showing a list of granted tickets, a list of queued tickets, etc.). Furthermore, embodiments enable the extensibility and general use of resource acquisition, where new additions and types of resource requests can be easily plugged-in/added. Even further, the use of tickets enable the handling of parallel data warehouse (PDW) data warehousing concurrency loads.

Such embodiments may be implemented in a variety of environments. For instance, FIG. 1 shows a block diagram a resource acquisition environment 100, according to an example embodiment. As shown in FIG. 1, environment 100 includes a resource management system 102, first-nth resource providers 104a-104n, first-nth sets of resources 106a-106n, and first-nth requesters 108a-108n. Environment 100 is described as follows.

Requesters 108a-108n are entities that may issue queries/requests for resources. Requesters 108a-108n may be fully automated to issue resource requests (e.g., being applications and/or other types of programs executing in a computer) and/or may involve human (user) interaction (e.g., a user interacting with a computer program to cause a query/request to be issued). Resource providers 104a-104n are configured to provide the resources in response to the requests provided by requesters 108a-108n. Resource providers 104a-104n may be of the same type or different types, including being primary resource providers, backup resource providers (e.g., providing backup storage), and/or other types of resource providers. As shown in FIG. 1, each of first-nth resource providers 104a-104n is coupled to a corresponding one of first-nth sets of resources 106a-106n. Resource providers 104a-104n may manage resources in sets of resources 106a-106n, and may provide resources of sets of resources 106a-106n to requesters 108a-108n in response to resource requests.

Resource management system 102 is configured to enable the resource requests issued by requesters 108a-108n to be serviced by resource providers 104a-104n. For example, as shown in FIG. 1, each of requesters 108a-108n may issue a corresponding one of resource requests 110a-110n. Resource requests 110a-110n each indicate one or more requested resources of resources 106a-106n. Resource requests 110a-110n are received by resource management system 102. Resource management system 102 is configured to service resource requests 110a-110n so that the indicated resources can be provided to requesters 108a-108n by resource providers 104a-104n in a manner that avoids concurrency issues. Concurrency issues can arise when simultaneous operations/accesses conflict with each other. Such concurrency issues can cause one or more undesired effects, such as indeterminate results (e.g., differences in outcome due to arrival ordering), deadlocks (e.g., two or more competing resource accesses that are each waiting for the other access(es) to finish), and/or starvation (e.g., perpetually denying access to a resource).

In an embodiment, resource management system 102 is configured to issue tickets to resource requests 110a-110n, granting some of the tickets immediately when arrived, and queuing some of the tickets for later grant. Such tickets enable concurrency issues to be avoided, by enabling a defined order of resource acquisition. As shown in FIG. 1, resource management system 102 may provide one or more acquire queries 112a-112n to resource providers 104a-104n to determine whether resources indicated in a ticket are available (e.g., not already acquired). If all of the resources of a ticket are available, the ticket may be granted. If all the resources of a ticket are not available, the ticket may be queued. When a ticket corresponding to a resource request is granted, the corresponding requester is enabled by resource management system 102 to access the corresponding resources at resource providers 104a-104n. When a ticket corresponding to a resource request is queued, the resource request is denied and may be attempted again at a later time (e.g., when he ticket is at the top of the queue).

In embodiments, any number of resource providers 104a-104n may be present, including numbers in the ones, tens, hundreds, and even greater numbers of resource providers. Furthermore, any number of sets of resources 106a-106n may be present, including numbers in the ones, tens, hundreds, and even greater numbers of sets of resources. Still further, any number of requesters 108a-108n may be present, including numbers in the ones, tens, hundreds, and even greater numbers of requesters.

Figure 2:
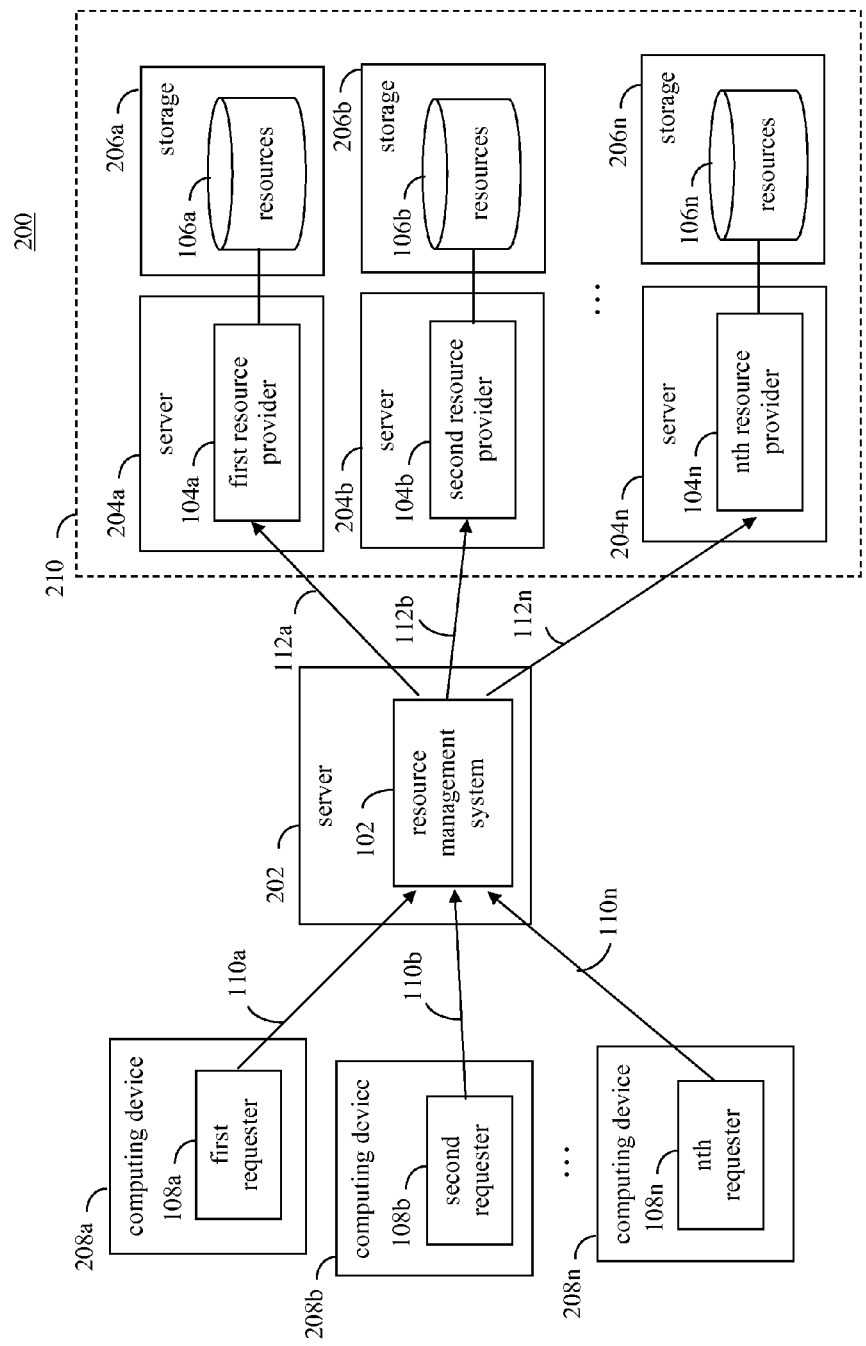
FIG. 2 shows a block diagram of a computer-based implementation of the resource acquisition environment of FIG. 1, according to an example embodiment.

Environment 100 of FIG. 1 may be configured in various ways, in embodiments. For instance, FIG. 2 shows a block diagram of a resource acquisition network 200, which is a computer-based implementation of resource acquisition environment 100 of FIG. 1, according to an example embodiment. As shown in FIG. 2, network 200 includes a management server 202, first-nth provider servers 204a-204n, first-nth storage 206a-206n, and first-nth computing devices 208a-208n. In the embodiment of FIG. 2, resource management system 102 is included in management server 202, first-nth resource providers 104a-104n are each included in a corresponding one of first-nth provider servers 204a-204n, first-nth sets of resources 106a-106n are each included in a corresponding one of first-nth storage 206a-206n, and first-nth requesters 108a-108n are each included in a corresponding one of first-nth computing devices 208a-208n. Each of first-nth storage 206a-206n is coupled to a corresponding one of first-nth servers 204a-204n.

Storage 206a-206n may each include one or more of any type of storage mechanism to store resources, including a magnetic disk (e.g., in a hard disk drive), an optical disc (e.g., in an optical disk drive), a magnetic tape (e.g., in a tape drive), a memory device such as a RAM device, a ROM device, etc., and/or any other suitable type of storage medium. Storage of each of storage 206a-206n may be arranged in any manner, such as being arranged in the form of network attached storage (NAS) arrays, storage area networks (SAN), and/or in further arrangements of physical storage.

Resources 106a-106n may include any number and types of resources, including files organized in directory structures or other arrangements, data that is collected and organized in databases (e.g., a relational database such as an SQL (structured query language) database, etc.), and/or other numbers and types of resources. In one embodiment, each server 204-storage 206 pair in network 200 may form a data warehouse, and collectively the data warehouses of server 204-storage 206 pairs in servers 204a-204n and storage 206a-206n may form a parallel data warehouse (PDW). The (PDW) may have any size, and management server 202 may be configured to have any amount and configuration of processing capability to service the PDW, including being a massively parallel processing (MPP) server appliance configured for large-scale data warehousing, such as being able to handle hundreds of terabyte of storage. Data warehouse embodiments are provided as example embodiments, and in other embodiments, resources in network 200 may be configured in other ways, as would be apparent to persons skilled in the relevant(s) from the teachings herein.

Computing devices 208a-208n may each be any type of stationary or mobile computing device, including a desktop computer (e.g., a personal computer, etc.), a mobile computer or computing device (e.g., a Palm® device, a RIM Blackberry® device, a personal digital assistant (PDA), a laptop computer, a notebook computer, a tablet computer (e.g., an Apple iPad™), a netbook, etc.), a smart phone (e.g., an Apple iPhone, a Google Android™ phone, a Microsoft Windows® phone, etc.), or other type of computing device. Servers 202 and 204a-204n may each be implemented in one or more computer systems, including one or more servers, which may be any type of computing device described herein or otherwise known that is capable of enabling the corresponding functionality described herein.

Computing devices 208a-208n and server 104 may be communicatively coupled in any manner, in a wired and/or wireless fashion, including by direct communication links and/or by one or more networks. Similarly, servers 204a-204n and server 104 may be communicatively coupled in any manner, in a wired and/or wireless fashion, including by direct communication links or by one or more networks. Still further, servers 204a-204n and storage 206a-206n pairs may each be communicatively coupled in any manner, in a wired and/or wireless fashion, including by direct communication links or by one or more networks Examples of networks include a LAN (local area network), a WAN (wide area network), or a combination of networks, such as the Internet. Examples of communication links include IEEE 802.11 wireless LAN (WLAN) wireless links, Worldwide Interoperability for Microwave Access (Wi-MAX) links, cellular network links, wireless personal area network (PAN) links (e.g., Bluetooth™ links), Ethernet links, USB (universal serial bus) links, etc.

The above described features of FIGS. 1 and 2 may be configured in various ways, and may perform their functions in various ways, in embodiments. Numerous exemplary embodiments for the above described features of FIGS. 1 and 2 and further embodiments are described in the following subsections.

A. Example Embodiments for Servicing Resource Requests

Figure 3:
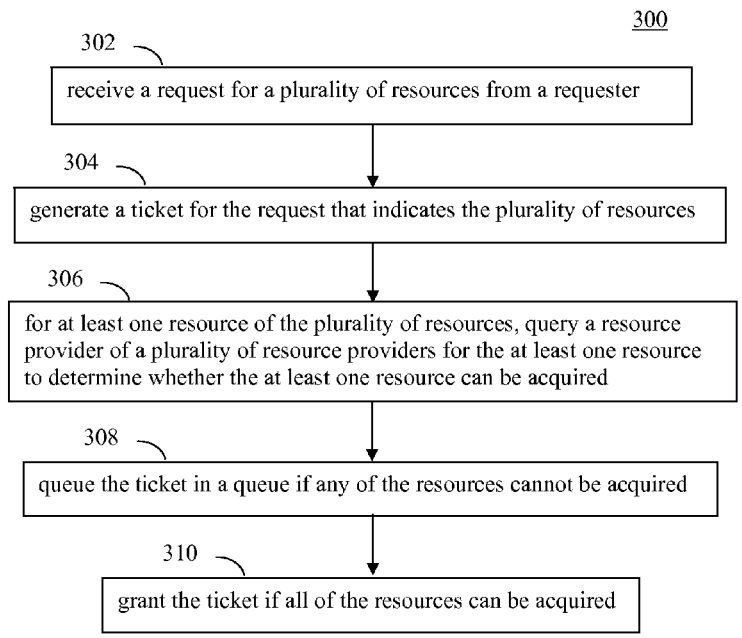
FIG. 3 shows a flowchart providing a process for servicing a resource request, according to an example embodiment.
Figure 4:
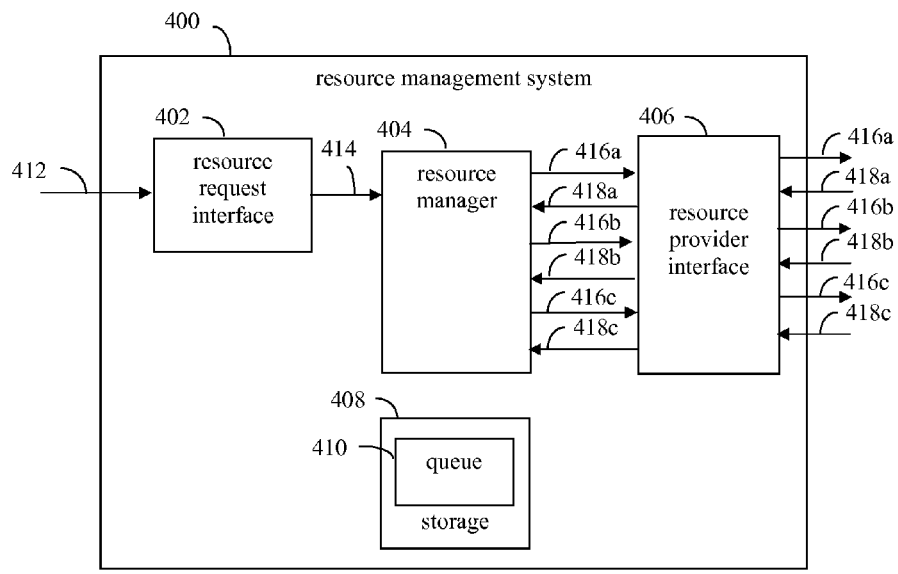
FIG. 4 shows a block diagram of a resource management system configured to process a resource request, according to an example embodiment.

According to an example embodiment, resource management system 102 may service resource requests to enable requesters to access resources in a manner that avoids consistency and/or other issues. Resource management system 102 may be configured to perform its functions in various ways. For instance, FIG. 3 shows a flowchart 300 providing a process for servicing a resource request, according to an example embodiment. In an embodiment, flowchart 300 may be performed by resource management system 102. Flowchart 300 is described as follows with reference to FIG. 4. FIG. 4 shows a block diagram of a resource management system 400, according to an example embodiment. Resource management system 400 is an example of resource management system 102. As shown in FIG. 4, resource management system 400 includes a resource request interface 402, a resource manager 404, a resource provider interface 406, and a storage 408. Further structural and operational embodiments will be apparent to persons skilled in the relevant art(s) based on the following discussion regarding flowchart 300 and resource management system 400 of FIG. 4.

Flowchart 300 begins with step 302. In step 302, a request is received from a requester for a plurality of resources. For example, as shown in FIG. 4, resource request interface 402 may receive a resource request 412. Resource request 412 may be received from a requester, such as one of requesters 108a-108n of FIG. 1. Resource request 412 indicates one or more resources that the requester desires to access. For instance, resource request 412 may indicate the requester desires to read one or more resources, to write to one or more resources, and/or to modify one or more resources. Resource request 412 may indicate various ways for the requester to access the resources. For instance, an access to a resource by the requester may be a shared lock access (e.g., a read by the requester) that locks the resource such that the resource can be read (but not written to, or updated) by other requesters during the shared lock, an exclusive lock access (e.g., a read by the requester) such that the resource cannot be read, written to, or updated by other requesters during the exclusive lock, a shared update access (e.g., a write or modify by the requester) such that the resource can be read (but not written to or updated) by other requesters during the shared update, or an exclusive update access (e.g., a write or modify by the requester) such that the resource cannot be read, written to, or updated by other requesters during the exclusive update.

In an embodiment, resource request interface 402 provides an interface that enables communications with various types of requesters. For instance, interface 402 may define one or more of constants, data types, types of procedures, and/or method signatures that enable requesters 108a-108n to each communicate with resource management system 400 in a uniform manner. When interface 402 is implemented in program code of an object-oriented language, interface 402 may define one or more type definitions for objects that may be exchanged between requesters and interface 402 as resource requests 412.

In step 304, a ticket is generated for the request that indicates the plurality of resources. As shown in FIG. 4, resource request interface 402 may be configured to generate a ticket 414 that indicates the resource(s) indicated in resource request 412. For instance, FIG. 5 shows a block diagram of resource request interface 402 configured to generate tickets, according to an example embodiment. As shown in FIG. 4, resource request interface 402 includes a ticket generator 502. Ticket generator 502 receives resource request 412, and is configured to generate ticket 414. For instance, ticket generator 502 may assign an identifier (e.g., a number, an alphanumeric value, etc.) to ticket 414 that may be used to identify ticket 414, and may include in ticket 414 any resources that are indicated in resource request 412.

In step 306, for at least one resource of the plurality of resources, a resource provider of a plurality of resource providers is queried for the at least one resource to determine whether the at least one resource can be acquired. For instance, as shown in FIG. 4, resource manager 404 receives ticket 414. Resource manager 404 is configured to query resource providers of resource providers 104a-104n that contain resources indicated in ticket 414 to determine whether the resources are available for acquisition by the requester. For instance, for each resource indicated in ticket 414, resource manager 404 may generate a query 416 that is transmitted to the resource provider that has the resource in associated storage. The resource provider may respond to the query with a query response 418 to indicate whether the resource is available or not, such as by a response that indicates "yes" or "no", "true" or "false", "1" or "0", or any other suitable response that distinguishes when a resource is available (e.g., not locked by a different requester) versus when the resource is not available (e.g., is locked by a different requester).

In an embodiment, resource manager 404 communicates with resource providers through resource provider interface 406. Resource provider interface 406 may be present to provide a generic interface for a variety of types of resource providers. For instance, interface 406 may define one or more of constants, data types, types of procedures, and/or method signatures that enable resource providers 104a-104n to each communicate with resource management system 400 in a uniform manner. When interface 406 is implemented in program code of an object-oriented language, interface 406 may define one or more type definitions for objects that may be exchanged between interface 404 and resource providers 104 as queries 416 and query responses 418, and well as enabling further communications between interface 406 and resource providers 104, as described herein.

For instance, in the example of FIG. 4, ticket 414 may indicate three resources that are desired to be acquired by first requester 108a. The resources in ticket 414 may be indicated by resource identifier, filename, and/or location (e.g., a directory location, a uniform resource indicator (URI) such as a uniform resource locator (URL)), a database name, etc. In this example, the three resources are respectively located in storage 106a-106c, managed by resource providers 104a-104c. As such, resource manager 404 may generate first-third queries 416a-416c corresponding to the three resources, which are respectively transmitted to resource providers 104a-104c through resource provider interface 406 (e.g., as "acquire" calls or other type of communication). First-third queries 416a-416c may be generated in series, such that a response is received from a prior query before transmitting the next query, or may all be generated and transmitted in parallel without waiting for any query responses.

As such, first query 416a indicating a first resource is transmitted to resource provider 104a, second query 416b indicating a second resource is transmitted to resource provider 104b, and third query 416c indicating a third resource is transmitted to resource provider 104c. Resource provider 104a checks whether the first resource in set of resources 106a is available or is unavailable (e.g., locked) in response to first query 416a, resource provider 104b checks whether the second resource in set of resources 106b is available or is unavailable (e.g., locked) in response to second query 416b, and resource provider 104c checks whether the third resource in set of resources 106c is available or is unavailable (e.g., locked) in response to third query 416c. Resource provider 104a transmits a first query response 418a indicating whether the first resource is acquirable, resource provider 104b transmits a second query response 418b indicating whether the second resource is acquirable, and resource provider 104c transmits a third query response 418c indicating whether the third resource is acquirable.

Resource manager 404 analyzes each query response (received through resource provider interface 406) to determine whether each desired resource is acquirable. In a series query embodiment, resource manager 404 may transmit a query, and analyze the corresponding response. If the response to a query indicates a resource is available, resource manager 404 may transmit a next query and analyze the corresponding response, until all queries have been transmitted and responded to, or until a response indicates that a resource is unavailable, at which time resource manager 404 may stop transmitting any further queries for the ticket. In a non-series (e.g., parallel) query embodiment, resource manager 404 may transmit all of the queries, and may analyze the responses to the queries when received, until a response indicates that a resource is unavailable or all responses provide acquirable responses.

For instance, in a series implementation of the current example, resource manager 404 may analyze each of query responses 418a-418c in series. Query response 418a may be received first (in response to query 416a), and if positive (indicating the resource can be acquired), query 416b may be provided. Query response 418b may be received next (in response to query 416b), and if positive (indicating the resource can be acquired), query 416c may be provided. Query response 418c may be received third/last (in response to query 416c), and analyzed whether positive or negative (indicating the resource cannot be acquired). In a parallel implementation of the current example, resource manager 404 may transmit each of queries 416a-416c, and may analyze each of query responses 418a-418c in an order in which they are received.

Referring back to flowchart 300 in FIG. 3, in step 308, the ticket is queued in a queue if any of the resources cannot be acquired. In an embodiment, if any resource indicated in ticket 414 cannot be acquired, resource manager 404 may queue ticket 414 in a queue 410 stored in storage 408. Queue 410 may be a data structure, such as a list, a table, an array, etc. Queue 410 includes any number of tickets (e.g., by ticket identifier and associated resources) that are waiting to be granted at a later time by resource manager 404.

For instance, FIG. 6 shows a block diagram of resource management system 400 of FIG. 4, where a resource request is queued, according to an example embodiment. Referring to FIG. 6, because at least one resource of ticket 414 is indicated in a query response 418 as not being acquirable, ticket 414 is queued in queue 410 in storage 408. Storage 408 may include one or more of any type of storage mechanism to store queue 410, including a magnetic disk (e.g., in a hard disk drive), an optical disc (e.g., in an optical disk drive), a magnetic tape (e.g., in a tape drive), a memory device such as a RAM device, a ROM device, etc., and/or any other suitable type of storage medium.

In an embodiment, each time one of resource providers 104a-104n determines that a resource of ticket 414 is available (and responds in query response 418), the resource provider 104 may lock the resource in the respective set of resources 106a-106c so that resource may be accessed by the requester, but not by other requesters. This locking may be performed in anticipation of ticket 414 being granted. However, if ticket 414 cannot be granted at the current time due to some resource not being available, ticket 414 is queued in queue 410, and the resources that were locked for ticket 414 are unlocked to be made available for other resource requests. In such an embodiment, a step 702 shown in FIG. 7 may be performed in step 308 of flowchart 300 (FIG. 3). Step 702 provides a process for unlocking resources that were locked for a ticket that cannot be fulfilled at a current time. In step 702, each resource provider is instructed to release any resources that were locked during step 306 if a resource provider indicates that a resource cannot be acquired.

For example, as shown in FIG. 6, in the current example, resource manager 404 may transmit one or more of unlock requests 602a-602c (e.g., as "release" calls or other types of communications through resource provider interface 406) to resource providers 104a-104c. Unlock requests 602a-602c instruct resource providers 104a-104c to unlock the respective resources of sets of resources 106a-106c that were locked by queries 416a-416c. For instance, resource providers 104a and 104b may have indicated that respective resources of queries 416a and 416b were acquirable, and may have locked the resources, but resource provider 104c may have indicated that the resource indicated in query 416c was not acquirable. In such case, resource manager 404 may transmit unlock requests 602a and 602b to resource providers 104a and 104b, respectively, to instruct resource providers 104a and 104b to unlock the locked resources. In an embodiment, a third unlock request 602c may not need to be transmitted to resource provider 104c, because the respective resource was already locked (e.g., by another requester) and therefore does not need to be unlocked.

Referring back to flowchart 300 in FIG. 3, in step 310, the ticket is granted if all of the resources can be acquired. In an embodiment, if all of the resources indicated in ticket 414 can be acquired, resource manager 404 may grant ticket 414. When ticket 414 is granted, resource manager 404 may enable the requester to access the indicated resources.

Figure 8:
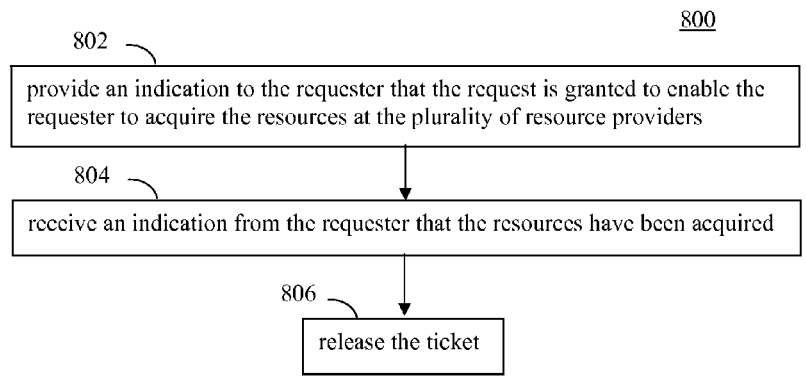
FIG. 8 shows a flowchart providing a process for granting a ticket representative of a resource request, according to an example embodiment.
Figure 9:
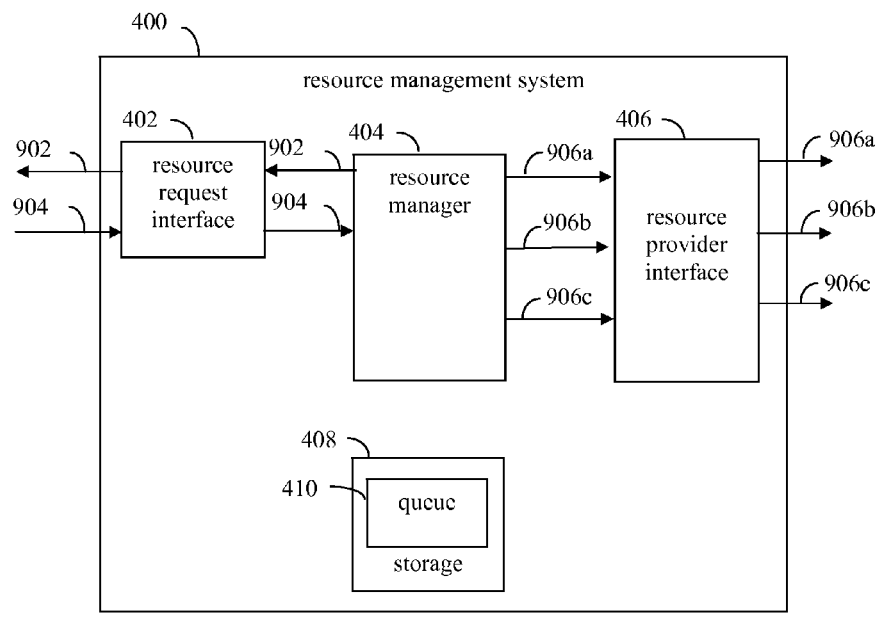
FIG. 9 shows a block diagram of the resource management system of FIG. 4, where a resource request is granted, according to an example embodiment.

For instance, an embodiment, resource manager 404 may perform a flowchart 800 shown in FIG. 8. Flowchart 800 provides a process for granting a ticket representative of a resource request, according to an example embodiment. Flowchart 800 is described at least in part with reference to FIG. 9. FIG. 9 shows a block diagram of resource management system 400, where resource request 412 is granted, according to an example embodiment. Further structural and operational embodiments will be apparent to persons skilled in the relevant art(s) based on the following discussion regarding flowchart 800 and resource management system 400 of FIG. 9.

Flowchart 800 begins with step 802. In step 802, an indication is provided to the requester that the request is granted to enable the requester to acquire the resources at the plurality of resource providers. For example, as shown in FIG. 9, resource manager 902 may transmit a granted indication 902 to the requester. Granted indication 902 indicates to the requester that the requester may proceed with accessing the resources at resource providers 104a-104n that are indicated in resource request 412.

Figure 10:
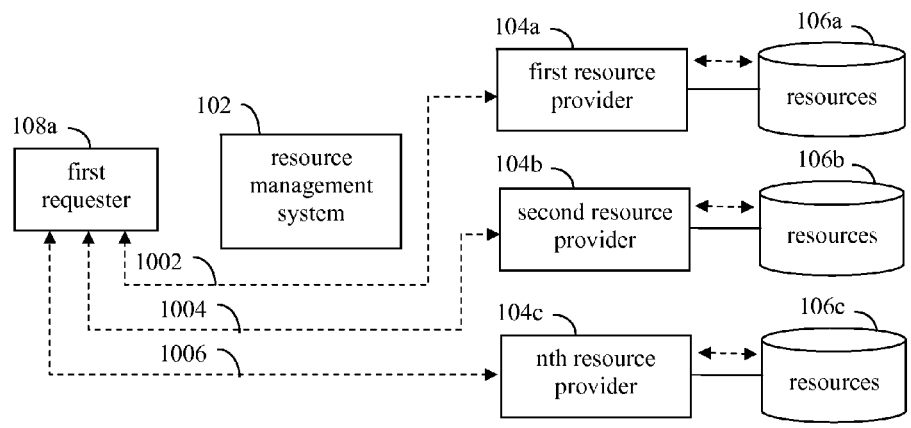
FIG. 10 shows a block diagram of a requester acquiring resources for a granted resource request, according to an example embodiment.

For instance, FIG. 10 shows a block diagram of first requester 108a acquiring resources of a granted resource request, according to an example embodiment. FIG. 10 shows first requester 108a, resource management system 102, first-third providers 104a-104d, and sets of resources 106a-106c. First requester 108a may have received granted indication 902 from resource manager 404 of FIG. 9, and as such may proceed with accessing resources. For instance, resource request 412 (FIG. 4) may have indicated that three resources of sets of resources 106a-106c, respectively, were requested. Because resource request 412 is granted, first requester 108a may proceed with accessing the resources at resources 106a-106c according to first-third communications 1002, 1004, and 1006 with resource providers 104a-104c, respectively.

First requester 108a may interact with a resource provider in any manner to access a resource, in embodiments. For instance, in one example, first requester 108a may read a resource from set of resources 106a according to first communication 1002 with resource provider 104a. First requester 108a may transmit a resource read request in first communication 1002 to resource provider 104a, and may receive a copy of the resource from resource provider 104a.

In another example, requester 108a may write to a resource in set of resources 106b according to second communication 1004 with resource provider 104b. Requester 108a may transmit a resource write request in second communication 1006 to resource provider 104b, may provide information to write to the resource (in set of resources 106b) to resource provider 104b, and may optionally receive a write confirmation from resource provider 104b indicating the write request was successful.

In still another example, requester 108a may modify a resource in set of resources 106c according to third communication 1006 with resource provider 104c. Requester 108a may transmit a resource modify request in third communication 1006 to resource provider 104b, may provide modification information for the resource (in set of resources 106c) to resource provider 104c to use to modify the resource, and may optionally receive a modify confirmation from resource provider 104c indicating the modify request was successful.

Note that with each type of resource access, the resource may be locked by the requester. Furthermore, the resource may be shared or not sharable.

Referring back to flowchart 800 in FIG. 8, in step 804, an indication is received from the requester that the resources have been acquired. After the requester has accessed all of the resources, the requester may inform resource manager 404 that the accesses are complete. For instance, as shown in FIG. 9, the requester (e.g., first requester 108a in the current example) may transmit an acquired confirmation 904 to resource management system 400. As shown in FIG. 4, acquired confirmation 904 may be received by resource request information interface 402, and passed to resource manager 404.

In step 806, the ticket is released. For instance, in an embodiment, after resource manager 404 receives acquired confirmation 904, resource manager 404 may release the ticket. For instance, in an embodiment, resource manager 404 may store ticket 414 and any other granted tickets in storage 408 (in a granted ticket data structure) while the requester(s) are accessing the resources. When resource manager 404 receives acquired confirmation 904, resource manager 404 may delete the corresponding ticket from storage 408 to release the ticket. In another embodiment, prior to deleting the ticket, resource manager 404 may instruct each resource provider for a resource of the ticket to release the corresponding resource, which may have been locked by the resource provider (to hold the resource for the requester).

For instance, continuing the current example, resource manager 404 of FIG. 9 may transmit release requests 906a-906c (e.g., as "release" calls or other types of communications through resource provider interface 406) to resource providers 104a-104c, respectively. Release requests 906a-906c may request that resource providers 104a-104c release their respective resources, which may have been locked (due to queries 416a-416c). In response to release requests 906a-906c, resource providers 104a-104c may unlock their respective resources (if locked). Once release requests 906a-906c are completed (and optionally confirmed by resource providers 906a-906c), resource manager 404 may finish releasing ticket 414 (e.g., may delete ticket 414).

B. Example Embodiments for Handling Concurrent Request for Same Resources

As described above, a same resource may be requested by multiple requesters. In conventional systems, this may lead to problems with consistency. Embodiments avoid problems with consistency by using tickets to manage resource requests.

Figure 11:
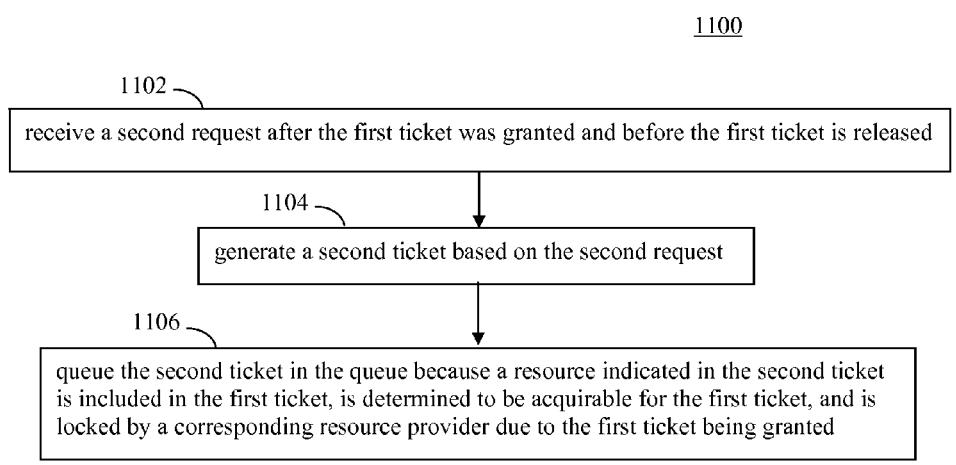
FIG. 11 shows a flowchart providing a process for handling a second ticket received while a granted first ticket has locked a resource of the second ticket, according to an example embodiment.

For instance, FIG. 11 shows a flowchart 1100 providing a process for handling a second ticket received while a granted first ticket has locked a resource of the second ticket, according to an example embodiment. In an embodiment, flowchart 1100 may be performed by resource management system 102 (FIG. 1) and resource management system 400 (FIG. 4). Further structural and operational embodiments will be apparent to persons skilled in the relevant art(s) based on the following discussion regarding flowchart 1100.

Flowchart 1100 begins with step 1102. In step 1102, a second request is received after the first ticket was granted and before the first ticket is released. For example, as described above with respect to FIG. 9, a ticket 414 (received as shown in FIG. 4) may be granted. Because ticket 414 is granted, resources included in ticket 414 may be locked so that the requester, such as first requester 108a, may access the resources. While ticket 414 is granted, a second request (a second request 412) may be received from another requester, such as second requester 108b, and the second request may include a list of resources, including one or more resources currently locked due to ticket 414 associated with first requester 108a.

In step 1104, a second ticket is generated based on the second request. For instance, for purposes of clarity, ticket 414 associated with first requester 108a may be referred to as a first ticket, and a second ticket may be generated by ticket generator 502 (FIG. 5) based on the second request received from second requester 108b. The second ticket includes the resources indicated in the second request.

In step 1106, the second ticket is queued in the queue because a resource indicated in the second ticket is included in the first ticket, is determined to be acquirable for the first ticket, and is locked by a corresponding resource provider due to the first ticket being granted. As described above, resource manager 404 may transmit queries 416 corresponding to the resources of the first and second tickets to resource providers to determine whether their resources are acquirable. Because the first ticket is granted, its resources were determined to be acquirable in query responses, and the resources may have been locked by their resource providers. Because at least one of the resources indicated in the second ticket is already locked due to being included in the first ticket, resource manager 404 may receive at least one query response 418 indicating that a resource of the second ticket is not acquirable. In such case, the second ticket cannot yet be granted, and is queued in queue 410 by resource manager 404. Subsequently to the first ticket being released (e.g., as described above with respect to flowchart 800 of FIG. 8), resource manager 404 may again transmit queries 416 corresponding to the resources of the second ticket to resource providers to determine whether the resources are acquirable, and if all of the resources are acquirable, the second ticket may be granted at that time In this manner, embodiments address concurrency when managing resources. Resource manager 404 uses tickets to limit a single requester to being enabled to access a resource at a particular time. Of course, this assumes that the resource is locked during the access. In some cases, a first requester may desire to access a resource in a manner that does not require a lock, which may be indicated in the first requester's resource request or otherwise known. In such case, the resource may not be locked when the first requester's ticket is granted. This enables other requesters to access the resource even during the time period between grant and release of the first requester's ticket.

C. Example Embodiments for Prioritizing Tickets

As described above, in some embodiments, priority for resource requests may be enabled. For instance, each resource request may provide a priority that is placed on its associated ticket. The priority may raise the level of the ticket in the queue (if the ticket is placed in the queue), increasing a probability that the ticket may be granted before other tickets (having lower or no priority).

Figure 12:
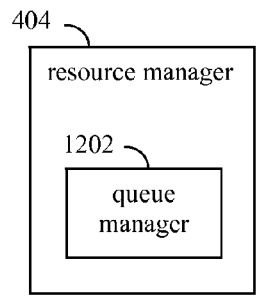
FIG. 12 shows a block diagram of a resource manager that includes a queue manager configured to prioritize tickets in a queue, according to an example embodiment.
Figure 13:
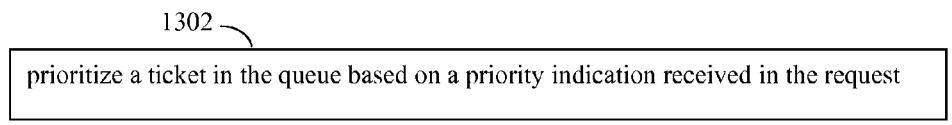
FIG. 13 shows a process for prioritizing tickets in a queue, according to an example embodiment.

For instance, FIG. 12 shows a block diagram of resource manager 404 including a queue manager 1202, according to an example embodiment. Queue manager 1202 is configured to prioritize tickets in queue 410. For instance, in an embodiment, queue manager 1202 may perform a step 1302 shown in FIG. 13. In step 1302, a ticket is prioritized in the queue based on a priority indication received in the request.

For example, in an embodiment, resource requests received from requesters may each include a priority indication for the resource request. The priority indication may have any format, including being numerical (e.g., 0 for lowest priority, 10 for highest priority, etc.), descriptive (e.g., "low", "medium", "high", etc.), or having other form. When resource request interface 402 receives a resource request 412 with a priority indication, resource request interface 402 may include the priority indication in ticket 414 generated for the resource request. Resource manager 404 receives ticket 414 (with the priority indication), and may determine that ticket 414 is to be queued. In such case, queue manager 1202 of FIG. 12 may place ticket 414 in a position in queue 410 according to the priority indication.

For instance, queue 410 may include a list of tickets that are generally handled in a first-in first-out (FIFO) order, a first-in last-out (FILO) order, or some other type of order. However, if some or all of the tickets have associated priorities, the tickets with associated priorities are arranged in queue 410 according to the priorities. Tickets that do not include priority indications may be assigned a default priority (e.g., a "medium" priority, a priority of "5", or other default value). Tickets that do have priorities may be arranged in queue 410 in order of their priorities, such that high priority tickets are retrieved from queue 410 by resource manager 404 (to re-determine whether they can be granted) prior to retrieval of low priority tickets. As new tickets are received, they are positioned in queue 410 according to their priority indication. In this manner, tickets of higher importance (e.g., where the requester is a higher ranking employee or official, etc.) can be processed faster than tickets of lesser importance.

C. Request Extensibility

It is noted that any number of different types of resource requests may be used, including read requests, write requests, and update requests. Each type of resource request may be shared or exclusive, such that other requesters may or may not be able to access (for reading, writing, or updating) a resource that is already acquired as part of a granted resource request. Furthermore, resource management systems 102 and 400 may be extended at any point in time, where additional and/or alternative types of resource requests can be added. This is made possible, at least in part, because resource management systems 102 and 400 do not necessarily need to know exactly how a particular resource request works. Instead, queries (queries 416) that indicate the resource requests are made to the resource providers, who do understand how the resource requests work, and who can indicate (in query responses 418) whether or not the requested resources can be acquired so that the resource requests can be performed.

III Example Computing Device Embodiments

Resource management system 102, resource providers 104a-104n, requesters 108a-108n, resource request interface 402, resource manager 404, resource provider interface 406, ticket generator 502, queue manager 1202, flowchart 300, step 702, flowchart 800, flowchart 1100, and step 1302 may be implemented in hardware, software, firmware, or any combination thereof. For example, resource management system 102, resource providers 104a-104n, requesters 108a-108n, resource request interface 402, resource manager 404, resource provider interface 406, ticket generator 502, queue manager 1202, flowchart 300, step 702, flowchart 800, flowchart 1100, and/or step 1302 may be implemented as computer program code configured to be executed in one or more processors. Alternatively, resource management system 102, resource providers 104a-104n, requesters 108a-108n, resource request interface 402, resource manager 404, resource provider interface 406, ticket generator 502, queue manager 1202, flowchart 300, step 702, flowchart 800, flowchart 1100, and/or step 1302 may be implemented as hardware logic/electrical circuitry. For instance, in an embodiment, one or more of resource management system 102, resource request interface 402, resource manager 404, resource provider interface 406, ticket generator 502, queue manager 1202, flowchart 300, step 702, flowchart 800, flowchart 1100, and/or step 1302 may be implemented together in a system-on-chip (SoC). The SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 14:
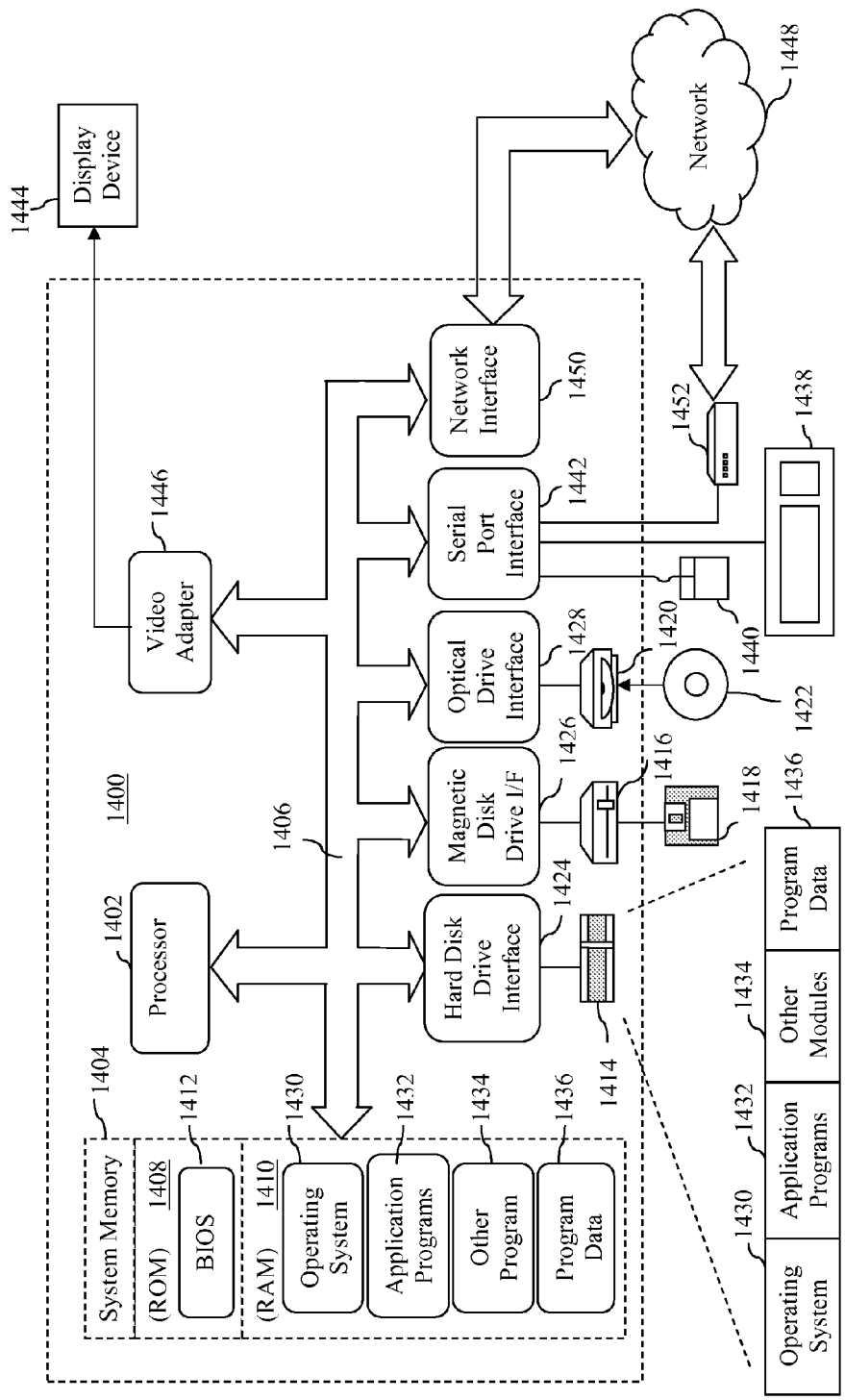
FIG. 14 shows a block diagram of an example computer that may be used to implement embodiments of the present invention.

FIG. 14 depicts an exemplary implementation of a computer 1400 in which embodiments of the present invention may be implemented. For example, management server 202, provider servers 204a-204n, and/or computing devices 208a-208n may be implemented in a computer system similar to computer 1400, including one or more features of computer 1400 and/or alternative features. Computer 1400 may be a general-purpose computing device in the form of a conventional personal computer, a mobile computer, a server, or a workstation, for example, or computer 1400 may be a special purpose computing device. The description of computer 1400 provided herein is provided for purposes of illustration, and is not intended to be limiting. Embodiments of the present invention may be implemented in further types of computer systems, as would be known to persons skilled in the relevant art(s).

As shown in FIG. 14, computer 1400 includes one or more processors 1402, a system memory 1404, and a bus 1406 that couples various system components including system memory 1404 to processor 1402. Bus 1406 represents one or more of any of several types of bus structures, including a memory bus or memory controller, a peripheral bus, an accelerated graphics port, and a processor or local bus using any of a variety of bus architectures. System memory 1404 includes read only memory (ROM) 1408 and random access memory (RAM) 1410. A basic input/output system 1412 (BIOS) is stored in ROM 1408.

Computer 1400 also has one or more of the following drives: a hard disk drive 1414 for reading from and writing to a hard disk, a magnetic disk drive 1416 for reading from or writing to a removable magnetic disk 1418, and an optical disk drive 1420 for reading from or writing to a removable optical disk 1422 such as a CD ROM, DVD ROM, or other optical media. Hard disk drive 1414, magnetic disk drive 1416, and optical disk drive 1420 are connected to bus 1406 by a hard disk drive interface 1424, a magnetic disk drive interface 1426, and an optical drive interface 1428, respectively. The drives and their associated computer-readable media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 1430, one or more application programs 1432, other program modules 1434, and program data 1436. Application programs 1432 or program modules 1434 may include, for example, computer program logic (e.g., computer program code) for implementing resource management system 102, resource providers 104a-104n, requesters 108a-108n, resource request interface 402, resource manager 404, resource provider interface 406, ticket generator 502, queue manager 1202, flowchart 300, step 702, flowchart 800, flowchart 1100, and/or step 1302 including any step of flowcharts 300, 800, and 1100), and/or further embodiments described herein.

A user may enter commands and information into the computer 1400 through input devices such as keyboard 1438 and pointing device 1440. Other input devices (not shown) may include a microphone, joystick, game pad, satellite dish, scanner, or the like. These and other input devices are often connected to processor 1402 through a serial port interface 1442 that is coupled to bus 1406, but may be connected by other interfaces, such as a parallel port, game port, or a universal serial bus (USB).

A display device 1444 is also connected to bus 1406 via an interface, such as a video adapter 1446. In addition to the monitor, computer 1400 may include other peripheral output devices (not shown) such as speakers and printers.

Computer 1400 is connected to a network 1448 (e.g., the Internet) through an adaptor or network interface 1450, a modem 1452, or other means for establishing communications over the network. Modem 1452, which may be internal or external, may be connected to bus 1406 via serial port interface 1442, as shown in FIG. 14, or may be connected to bus 1406 using another interface type, including a parallel interface.

As used herein, the terms "computer program medium," "computer-readable medium," and "computer-readable storage medium" are used to generally refer to media such as the hard disk associated with hard disk drive 1414, removable magnetic disk 1418, removable optical disk 1422, as well as other media such as flash memory cards, digital video disks, random access memories (RAMs), read only memories (ROM), and the like. Such computer-readable storage media are distinguished from and non-overlapping with communication media (do not include communication media). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media. Embodiments are also directed to such communication media.

As noted above, computer programs and modules (including application programs 1432 and other program modules 1434) may be stored on the hard disk, magnetic disk, optical disk, ROM, or RAM. Such computer programs may also be received via network interface 1450, serial port interface 1442, or any other interface type. Such computer programs, when executed or loaded by an application, enable computer 1400 to implement features of embodiments of the present invention discussed herein. Accordingly, such computer programs represent controllers of the computer 1400.

The invention is also directed to computer program products comprising software stored on any computer useable medium. Such software, when executed in one or more data processing devices, causes a data processing device(s) to operate as described herein. Embodiments of the present invention employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMs, nanotechnology-based storage devices, and the like.

VI. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:
1. A method for managing resources implemented in at least one computing device, comprising:
   receiving a request for a plurality of resources from a requester;
   generating a ticket for the request that indicates the plurality of resources;

assigning a default priority for the ticket based on a determination that the request does not include a priority indication, the default priority being a priority that is greater than a low priority and less than a high priority;

for at least one resource of the plurality of resources, querying a resource provider of a plurality of resource providers for the at least one resource to determine whether the at least one resource can be acquired;

queuing the ticket in a queue if any of the resources cannot be acquired;

instructing each resource provider to release any resources that were locked during said querying if a resource provider indicates that a resource cannot be acquired during said querying; and granting the ticket if all of the resources can be acquired.

2. The method of claim 1, wherein if a resource provider indicates that a resource can be acquired during said querying, the resource provider locks the resource from being acquired by others than the requester.

3. The method of claim 1, wherein the ticket is granted because all of the resources can be acquired, said granting comprising:

providing an indication to the requester that the request is granted to enable the requester to acquire the resources at the plurality of resource providers.

4. The method of claim 3, further comprising:

receiving an indication from the requester that the resources have been acquired; and releasing the ticket.

5. The method of claim 4, wherein said releasing the ticket comprises:

instructing each resource provider for a corresponding resource of the plurality of resources to release the corresponding resource.

6. The method of claim 4, further comprising:

receiving a second request after the first ticket was granted and before the first ticket is released;

generating a second ticket based on the second request; and queuing the second ticket in the queue because a resource indicated in the second ticket is included in the first ticket, is determined to be acquirable for the first ticket, and is locked by a corresponding resource provider due to the first ticket being granted.

7. The method of claim 6, further comprising:

retrieving the second ticket from the queue after the first ticket is released;

querying the resource providers for the resources of the second ticket to determine whether each of the resources of the second ticket can be acquired;

queuing the second ticket in the queue and retrieving a next ticket from the queue if any of the resources of the second ticket cannot be acquired; and granting the second ticket if all of the resources of the second ticket can be acquired.

8. The method of claim 1, wherein the ticket is queued because at least one of the resources cannot be acquired, said queuing comprising:

prioritizing the ticket in the queue based on a priority indication received in the request.

9. A system for managing resources, comprising:

at least one processing device;

a resource request interface that receives a request for a plurality of resources from a requester, and generates a ticket for the request that indicates the plurality of resources;

a resource provider interface communicatively coupled with a plurality of resource providers; and a resource manager implemented using the at least one processing device that, for at least one resource of the plurality of resources, queries a resource provider for the at least one resource through the resource provider interface to determine whether the at least one resource can be acquired;

the resource manager configured to assign a default priority for the ticket based on a determination that the request does not include a priority indication, the default priority being a priority that is greater than a low priority and less than a high priority;

the resource manager configured to queue the ticket in a queue if any of the resources cannot be acquired, and to instruct each resource provider through the resource provider interface to release any resources of the plurality of resource that were locked if a resource provider indicates that a resource of the plurality of resources cannot be acquired; and the resource manager configured to grant the ticket if all of the resources can be acquired.

10. The system of claim 9, wherein if in response to the query a resource provider indicates that a resource can be acquired, the resource provider locks the resource from being acquired by others than the requester.

11. The system of claim 9, wherein, if the ticket is granted, the resource manager provides an indication to the requester that the request is granted to enable the requester to acquire the resources at the plurality of resource providers.

12. The system of claim 11, wherein, in response to providing the indication to the requester that the request is granted, the resource manager receives an indication from the requester that the resources have been acquired and the resource manager releases the ticket.

13. The system of claim 12, wherein the resource manager releases the ticket at least by instructing each resource provider for a resource of the plurality of resources to release the resource.

14. The system of claim 12, wherein the resource request interface receives a second request after the first ticket was granted and before the first ticket is released, and generates a second ticket based on the second request; and the resource manager queues the second ticket in the queue because a resource indicated in the second ticket is included in the first ticket, is determined to be acquirable for the first ticket, and is locked by a corresponding resource provider due to the first ticket being granted.

15. The system of claim 14, wherein after the first ticket is released, the resource manager is configured to retrieve a second ticket from the queue, to query the resource providers for the resources of the second ticket to determine whether each of the resources of the second ticket can be acquired, to queue the second ticket in the queue and retrieve a next ticket from the queue if any of the resources of the second ticket cannot be acquired, and to grant the second ticket if all of the resources of the second ticket can be acquired.

16. The system of claim 9, wherein the resource manager comprises:

a queue manager configured to prioritize the ticket in the queue based on a priority indication received in the request.

17. A computer program product comprising a computer usable storage medium having computer readable logic embodied in said storage medium for enabling a processor to manage resources, comprising:

first computer readable logic that enables the processor to generate a ticket for a received request that indicates a plurality of resources indicated in the request and a priority indication included in the request, the request received from a requester;

second computer readable logic that enables the processor to query a plurality of resource providers for the resources indicated in the ticket to determine whether all resources indicated in the ticket can be acquired;

third computer readable logic that enables the processor to queue the ticket in a queue according to the priority indication if any of the resources cannot be acquired, and to instruct each resource provider through the resource provider interface to release any resources of the plurality of resource that were locked if a resource provider indicates that a resource of the plurality of resources cannot be acquired;

fourth computer readable logic that enables the processor to grant the ticket if all of the resources can be acquired; and fifth computer readable logic that enables the processor to assign a default priority for the ticket based on a determination that the request does not include a priority indication, the default priority being a priority that is greater than a low priority and less than a high priority.

18. The computer program product of claim 17, wherein said fourth computer readable logic comprises:
computer readable logic that enables the processor to provide an indication to the requester that the request is granted to enable the requester to acquire the resources at the plurality of resource providers;
computer readable logic that enables the processor to receive an indication from the requester that the resources have been acquired; and
computer readable logic that enables the processor to release the ticket.

19. The computer program product of claim 18, wherein said computer readable logic for enabling the processor to release the ticket comprises:
computer readable logic that enables the processor to instruct each resource provider for a corresponding resource of the plurality of resources to release the corresponding resource.

20. The computer program product of claim 17, wherein said third computer readable logic comprises:
computer readable logic that enables the processor to prioritize the ticket in the queue based on a priority indication received in the request.

* * * * *